United States Patent [19]

Saunders et al.

[11] 4,353,409
[45] Oct. 12, 1982

[54] APPARATUS AND METHOD FOR CONTROLLING A VARIABLE AIR VOLUME TEMPERATURE CONDITIONING SYSTEM

[75] Inventors: James F. Saunders, Onalaska; Robert E. Krocker, Stoddard, both of Wis.

[73] Assignee: The Trane Company, La Crosse, Wis.

[21] Appl. No.: 106,977

[22] Filed: Dec. 26, 1979

[51] Int. Cl.³ .............................................. F25B 29/00
[52] U.S. Cl. .......................................... 165/2; 165/27; 165/29; 165/12; 236/1 EA; 62/175; 62/186
[58] Field of Search .................... 165/27, 28, 29, 22, 165/26, 2, 12; 236/1 EA, 49, 91 F, 37; 62/175, 186, 228.4, 196 A, 203, 208, 209; 219/364, 370, 486

[56] References Cited

U.S. PATENT DOCUMENTS

| | | | |
|---|---|---|---|
| 3,348,607 | 10/1967 | Cootey | 165/28 |
| 3,653,590 | 4/1972 | Elsea | 236/49 |
| 3,658,244 | 4/1972 | Caldwell | 236/37 |
| 3,768,545 | 10/1973 | Wills | 165/27 |
| 4,086,781 | 5/1978 | Brody et al. | 236/49 X |
| 4,121,655 | 10/1978 | Hart | 165/27 |
| 4,152,902 | 5/1979 | Lush | 62/175 X |
| 4,156,455 | 5/1979 | van der Mevlen | 165/32 |
| 4,182,484 | 1/1980 | Stanke et al. | 236/91 F |
| 4,189,929 | 2/1980 | Russell | 62/175 |
| 4,244,517 | 1/1981 | Stanke et al. | 236/49 |

Primary Examiner—Albert W. Davis
Assistant Examiner—Margaret A. Focarino
Attorney, Agent, or Firm—Carl M. Lewis; Peter D. Ferguson; Ronald M. Anderson

[57] ABSTRACT

Apparatus and method for controlling a temperature conditioning system in which a plurality of stages of temperature conditioning apparatus may be selectively energized to meet a temperature conditioning demand in a comfort zone into which the flow of temperature conditioned air is varied in response to temperature therein. Control means are operative to determine the differential temperature of the return air and the supply air and to energize and de-energize stages of temperature conditioning in response thereto. Means are provided to measure the outdoor ambient temperature, thereby enabling the control means to determine the heating capacity of an ambient air source heat pump relative to the outdoor ambient air temperature, and to energize and de-energize heating stages as appropriate, to meet heating demand.

36 Claims, 5 Drawing Figures

HEATING STAGE CONSTANTS

| | TURN ON | | TURN OFF | |
|---|---|---|---|---|
| STAGE | D | B | D | B |
| C1 | 12 | 5 | 4 | 15 |
| C2 | 6 | 10 | 3 | 25 |
| H1 | 3 | 15 | 3 | 35 |
| H2 | 3 | 25 | 3 | 42 |
| H3 | 3 | 35 | 3 | 50 |
| H4 | 3 | 45 | 3 | 60 |

$$F_{ON/OFF} = \frac{ODT}{D} + B,$$ WHERE "ODT" IS THE OUTDOOR AMBIENT AIR TEMPERATURE, AND "F" IS THE HEATING FUNCTION.

APPARATUS AND METHOD FOR CONTROLLING A VARIABLE AIR VOLUME TEMPERATURE CONDITIONING SYSTEM

TECHNICAL FIELD

This invention generally pertains to apparatus and method for controlling a temperature conditioning system, wherein the temperature in a comfort zone is maintained at a setpoint by regulation of the flow of temperature conditioned air into the comfort zone.

BACKGROUND ART

In a variable air volume (VAV) temperature conditioning system, a plurality of comfort zones are maintained at a setpoint temperature by regulation of the flow of temperature conditioned supply air into each of the zones. Controls for a VAV system are generally designed to maintain the supply air at a relatively constant temperature, in the range of 50° to 60° F. VAV systems are thus normally used for cooling only applications, as for example in cooling the interior zones of large buildings. However, VAV systems equipped for automatic changeover from heating to cooling have been used successfully in application to single story buildings of less than 6,000 square feet, having total cooling requirements of 15 tons or less. In a relatively small building, it is less likely that there would be an interior zone requiring cooling at the same time an exterior zone required heating. VAV systems are generally not used in heating only applications, since constant volume systems are typically more efficient.

A conventional VAV system includes controls which energize and de-energize stages of temperature conditioning in response to the deviation of the supply air temperature from a setpoint. To insure more responsive control, means may also be provided to reset the supply air temperature setpoint in proportion to the mixed, return and fresh air temperature. For example, using a reset ratio of 1:5, if the mixed air temperature decreases by 5° F., the supply air temperature setpoint would be increased by 1° F. The reset ratio is selected to optimize the balance between compressor energy consumption and the indoor fan energy consumption. Anti-cycling timers are also included in a conventional VAV system control to prevent damage to the compressors which might otherwise result from too rapid cycling, and to allow time for the system to react to changes in staging of the temperature conditioning apparatus.

One of the disadvantages of the prior art VAV system controls is that by responding to deviations of the supply temperature from a setpoint, the controls energize stages of temperature conditioning sooner and more often than may be necessary to meet the true temperature conditioning demand. This may result in excessive cycling and excessive energy consumption by the temperature conditioning apparatus. Prior art controls which reset the supply air temperature setpoint in proportion to the mixed, return and fresh air temperature are less susceptible to this problem, but nevertheless fail to control staging in response to temperature conditioning demand. These controls provide the coldest supply air when the demand for cooling is low, instead of when it is high.

Since a heat pump provides both heating and cooling capability, it would not normally be used in a VAV system. However, where heating-only, or both heating and cooling capability are desired, a heat pump provides an energy efficient alternative to a fuel oil or natural gas furnace installation. Unfortunately, the heating efficiency of an ambient air source heat pump declines significantly as the outdoor temperature drops, making it necessary to provide auxiliary heating stages for operation at low ambient temperatures. A control for a VAV system which includes a heat pump should therefore properly provide means to match the available heating capacity of the system with the heating demand, such that staging is controlled as a function of the outdoor ambient temperature. The prior art VAV control systems do not provide means to accomplish this function.

Under certain conditions, an indoor heat exchange coil in a cooling system may develop a layer of frost and ice on its surface, greatly reducing its cooling capacity due to the restricted air flow across its surface. Under these circumstances, it is necessary to provide means to defrost the coil. Various techniques have been developed in the prior art to detect a frost covered indoor heat exchanger and to defrost it. Hot gas bypass, a process in which hot gas from the compressor is applied to the indoor heat exchanger, bypassing the outdoor condensing coil is a common method of preventing frosting of the coil by maintaining a minimum saturated suction temperature above 30° F. This method for preventing frost formation and other prior art means for defrosting a heat exchange coil waste energy and, in terms of hardware, are expensive to provide.

In consideration of the problems described above, it is an object of this invention to provide a more efficient control for a temperature conditioning system having a plurality of stages for temperature conditioning air supplied to comfort zones wherein the rate of flow of that air is regulated so as to maintain a setpoint temperature in each of those zones.

It is a further object of this invention to minimize energy consumption and cycling of the temperature conditioning system by controlling the temperature conditioning apparatus thereof in response to temperature conditioning demand, such that the maximum absolute magnitude of the difference of the return air and the supply air temperature occurs in response to high temperature conditioning demand.

A still further object of this invention is to provide means and method for controlling heating apparatus in response to a heating demand, taking into consideration that the heating capacity of that apparatus is a function of the outdoor ambient air temperature.

Yet a still further object of this invention is to detect the need to defrost the indoor heat exchanger by sensing the suction line temperature; and to defrost the indoor heat exchanger by de-energizing the stages of cooling then in operation and circulating return air through the heat exchanger to melt the ice and frost thereon, and thereby cool the air supplied to the comfort zone.

Still a further object of this invention is to provide means and method for controlling the mode in which the temperature conditioning system operates, i.e., in a heating, cooling, or ventilation mode, as a function of the outdoor ambient temperature, and enthalpy.

These and other objects of the subject invention will become apparent from the description which follows and by reference to the attached drawings.

DISCLOSURE OF THE INVENTION

The subject invention is an apparatus for controlling the operation of components of a temperature conditioning system in which a plurality of stages of temperature conditioning apparatus may be selectively energized to meet a temperature conditioning demand in a comfort zone into which the flow of temperature conditioned air is varied in response to temperature therein. The apparatus comprises means for sensing the temperature of the temperature conditioned supply air and of the return air. Control means are responsive to the return air and supply air temperature sensing means, and are operative to determine therefrom the differential temperature of the return air and supply air. In response to the magnitude of this differential temperature, the control means are operative to energize and de-energize successive stages of temperature conditioning apparatus.

The subject invention has application to a heating-only, cooling-only, or combined heating and cooling system. With regard to the heating aspect, the apparatus further comprises an ambient air source heat pump, having a plurality of heating stages, the total heating capacity of which varies with outdoor ambient temperature, and means for sensing the outdoor ambient temperature. The control means are responsive to the outdoor ambient temperature sensing means and are operative to determine therefrom the total heating capacity of the temperature conditioning system with the stages of heating which are currently energized, if any. The control means are further operative to successively energize one or more stages of heating if the differential temperature indicates that the heating capacity of any currently energized heating stages is inadequate, or to successively de-energize one or more stages of heating if the heating capacity is excessive.

With regard to the cooling aspect, the apparatus further includes compressor means for compressing a vaporized refrigerant received via a suction line, an indoor heat exchanger for providing heat transfer between the refrigerant and air circulated into the comfort zone, and means for sensing the suction line temperature. The control means are responsive to the suction line temperature sensing means and are thereby operative to determine the need for defrosting the indoor heat exchanger to melt ice and frost formed thereon. If the suction line temperature is less than a predetermined limit, the control means de-energizes the stages of cooling that are then operating, and thereafter continues to circulate the air through the cooling system, whereby the air is cooled by the melting ice on the indoor heat exchanger.

The temperature conditioning system, selectively operable in either a heating mode, a cooling mode, or a ventilation mode, further comprises means for sensing the outdoor ambient temperature and enthalpy to determine the mode in which the system should operate. The control means selectively operates the temperature conditioning system in the heating mode if the outdoor ambient temperature is less than a predetermined lower limit, and in the cooling mode if it exceeds a predetermined upper limit, or if it is between the predetermined upper and lower limits and the outdoor ambient enthalpy exceeds an upper limit. Otherwise, the control means operates the system in the ventilation mode.

Methods for effecting the functions provided by the above described apparatus are a further aspect of this invention.

DESCRIPTION OF THE PREFERRED EMBODIMENT

Figure 1:
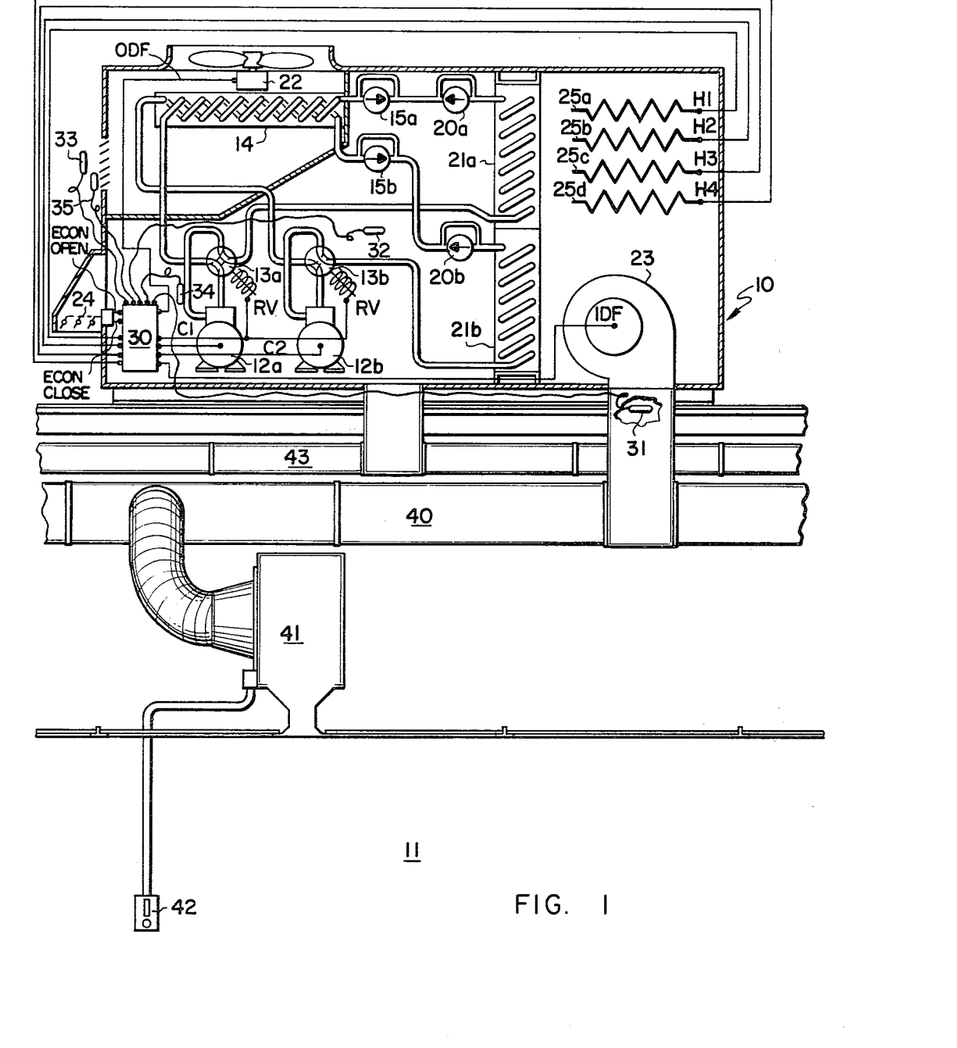
FIG. 1 is a diagram showing a VAV temperature conditioning system comprising a heat pump, the components of which are controlled by the subject invention.

Referring now to FIG. 1, temperature conditioning apparatus 10 is shown for supplying temperature conditioned air to a comfort zone 11. The temperature conditioning apparatus include a generally conventional dual circuit heat pump of the vapor compression type, each circuit having a compressor 12, reversing valve 13, expansion/bypass valves 15 and 20, and indoor heat exchanger 21. The system further includes outdoor heat exchanger 14, outdoor fan 22, indoor fan 23, economizer inlet damper assembly 24, and four electric heating stages 25. Compressors 12a and 12b are selectively operable to compress a refrigerant vapor which passes through reversing valves 13 and through outdoor heat exchanger coils 14, in heat exchange relationship with outdoor ambient air circulated therethrough by the outdoor fan 22. The condensed refrigerant thereafter bypasses through expansion/bypass valve 15, and expands through expansion/bypass valve 20 into the indoor heat exchanger 21, absorbing heat from the mixed return air from the comfort zone 11 and outdoor ambient air, if any, which enters through the economizer inlet damper assembly 24. The vaporized refrigerant thereafter returns through reversing valves 13 to compressors 12.

Air supplied to the comfort zone 11 may be heated rather than cooled, by operating the reversing valves 13, thereby interchanging the functions of the outdoor and indoor heat exchange coils 14 and 21. In the heating mode, the outdoor heat exchanger coil 14 serves as an evaporator, and the indoor heat exchanger coils 21, as refrigerant vapor condensing units. Likewise, expansion/bypass valves 20 operate to bypass condensed liquid refrigerant, which expands through expansion/bypass valves 15.

During operation in the heating mode, the capacity and efficiency of a heat pump are significantly reduced when the outside air temperature is relatively low. Under these conditions, it is necessary to provide auxiliary heating stages. In the preferred embodiment, these include auxiliary electric heating stages 25 which may be selectively energized as required to meet the heating demand. The electric heating stages 25 and the other components comprising temperature conditioning apparatus 10 are controlled by unit controller 30, as described in greater detail hereinbelow.

Unit controller 30 is able to selectively energize and de-energize each of the following components comprising temperature conditioning apparatus 10, by controlling supply lines conveying electrical power to the components. The control lines for these components are labeled in FIGS. 1 and 2 as follows: Compressor 12a, C1; compressor 12b, C2; reversing valves 13a and 13b, RV; outdoor fan 22, ODF; indoor fan 23, IDF; economizer damper assembly 24, Econ Open/Econ Close; and electric heat stages 25a through 25d, H1, H2, H3, and H4, respectively.

Unit controller 30 is connected to thermistors 31, 32, 33, and 34, for sensing temperature at various locations. Thermistor 31 is disposed in the supply air duct 40 for sensing the temperature of the temperature conditioned supply air; thermistor 34 is attached to the suction line of compressor 12a; thermistor 33 is disposed where it may sense the outdoor ambient air temperature; and thermistor 32 is disposed in the return air plenum to sense the "return air" temperature. For purposes of this discussion and of the claims which follow, the term "return air" refers to air immediately upstream of the indoor heat exchanger 21, and said air may be a mixture of the air returning from the temperature conditioned zone 11 and outdoor ambient fresh air, or if fresh air is not provided, only the air returning from the temperature conditioned zone 11.

Outdoor ambient air enthalpy sensor 35, of conventional design, is also connected to unit controller 30. Unit controller 30 is thus receptive of signals from thermistors 31 through 34 and to the outdoor ambient air enthalpy sensor 35, and controls the apparatus of temperature conditioning system 10 in response thereto as will be explained.

During operation, temperature conditioned air flows from the indoor fan 23 through supply air duct 40 into each of the comfort zones 11. Flow controller 41 regulates the flow of temperature conditioned air into the comfort zones 11 in response to a thermostat 42, in the same manner as in a conventional VAV system. As the temperature in comfort zone 11 deviates from a setpoint, thermostat 42 causes the flow regulator 41 to vary the flow of temperature conditioned air to reduce the deviation. Air returns to the temperature conditioning apparatus 10 through duct 43.

Figure 2:
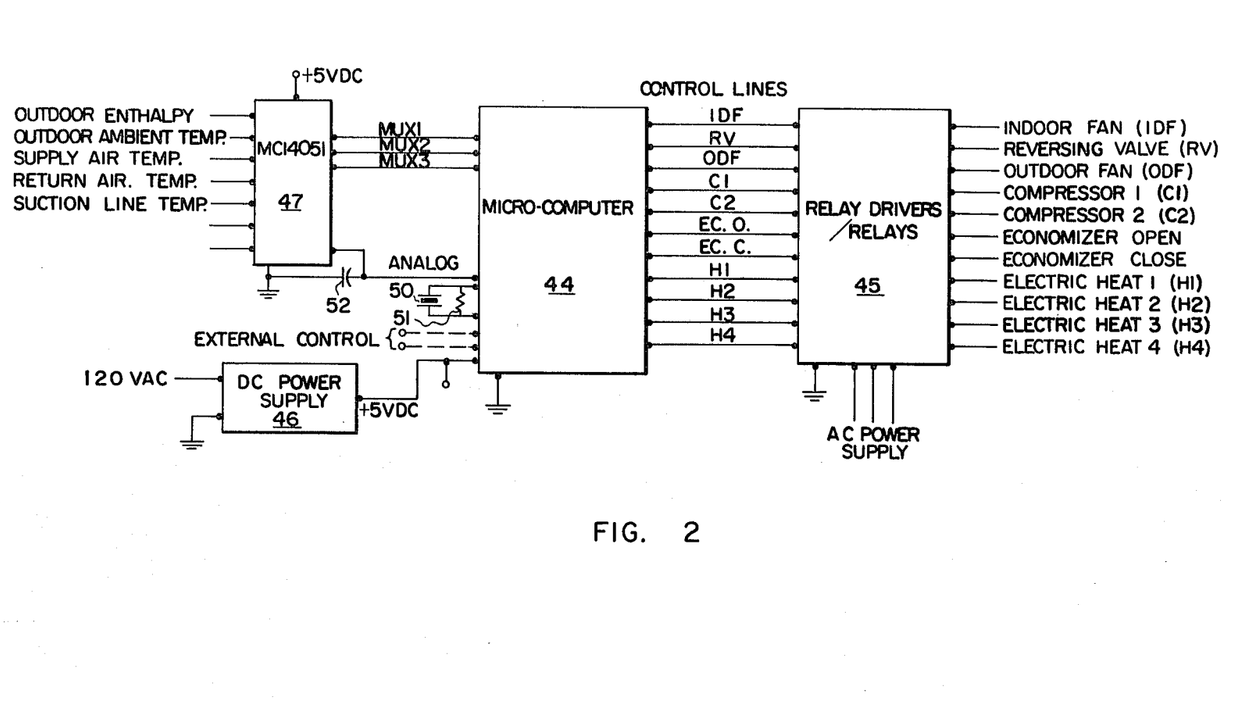
FIG. 2 is a schematic diagram of the control circuitry of the subject invention.

With reference to FIG. 2, a block diagram of unit controller 30 is shown comprising microcomputer 44, relay driver board 45, multiplex input chip 47 and DC power supply 46. Microcomputer 44 is connected via control lines to relay driver board 45, and is thereby operative to selectively energize the components of the temperature conditioning apparatus 10 via the electrical power supply lines labeled above. Microcomputer 44 includes a central processing unit (CPU), a read-only memory (ROM), a random access memory (RAM), an internal timer/counter, and an analog-to-digital (A-D) converter. In the preferred embodiment, microcomputer 44 is an Intel type 8022 large scale integrated circuit, specifically selected for its on-chip analog-to-digital converter capability. A DC power supply 46, of generally conventional design, provides a regulated 5 volts DC to power microcomputer 44 and the other components connected to the +5 DC bus of unit controller 30.

Quartz crystal 50, connected in parallel with resistor 51, provides a stable time base for microcomputer 44. Typically, a 3.6 megaHertz crystal would be used for this purpose.

Multiplexor 47 is connected to microcomputer 44 via 3 control lines MUX1 through MUX3. Multiplexor 47 receives a digital select code from microcomputer 44 via multiplex lines MUX1 through MUX3, decodes that information, and provides the selected analog signal on an "ANALOG" signal line, as input to the built-in A-D converter of microcomputer 44. Capacitor 52 is connected between the "ANALOG" signal line and ground to minimize noise from external sources. In this embodiment multiplexor 47 is a Motorola Corporation integrated circuit type 14051. Not shown in FIG. 2 are the sensors which provide the analog signal inputs to multiplexor 45. These analog signals are provided by the enthalpy sensor 35, and thermistors 31 through 34. Three other analog inputs to multiplexor 47 are available, however their use is not required to enable the present invention and therefore will not be disclosed.

Relay driver board 45 is of conventional design, and includes triacs and relays for energizing the current carrying loads in response to logic level control signals from microcomputer 44. Details of such circuitry should be well known to one skilled in the art.

Figure 3:
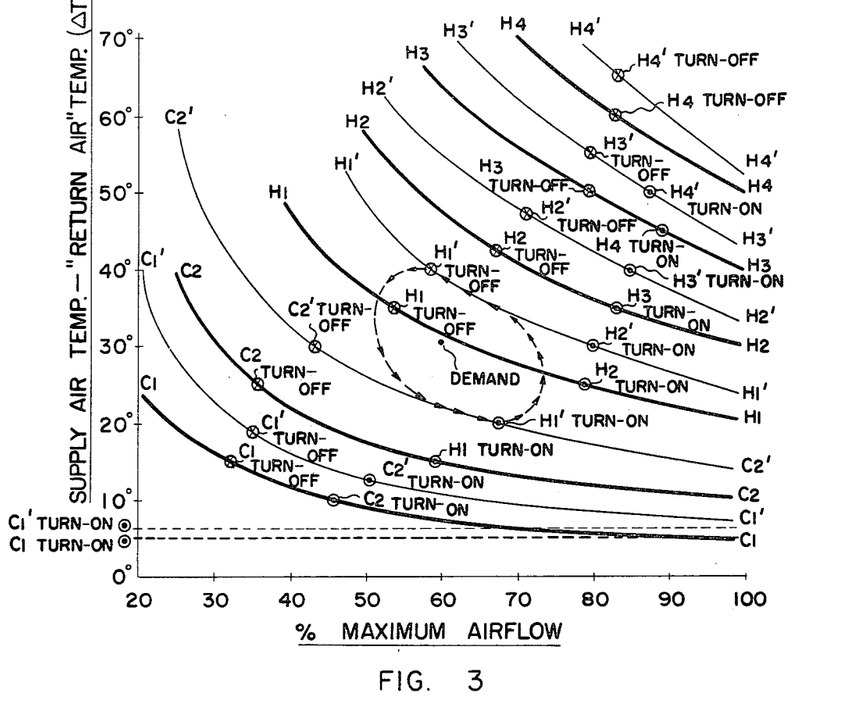
FIG. 3 is a graph showing the heating capacity curves for a typical heat pump under specific outdoor ambient air temperature conditions.

As noted above, the efficiency and capacity of an ambient air source heat pump operating in the heating mode decreases as the outdoor ambient air temperature drops. To illustrate that fact, the heating capacity curves of a typical heat pump operating at outdoor ambient air temperatures of 0° and 15° F., and an indoor comfort zone setpoint temperature of 70° F. are shown in FIG. 3. These represent the accumulative heating capacity as successive stages of heating are added, and are plotted in terms of the differential temperature between the supply air and the "return air", delta T in °F., as a function of percent maximum air flow through the temperature conditioning apparatus 10. Darker lines are used to depict the heating capacity curves at 0° F. and lighter lines to depict the curves at 15° F. outdoor ambient air temperature. In the heating mode, delta T is defined as the temperature rise of the "return air" as it passes through the indoor heat exchanger 21 and over any energized heating stages 25. By studying FIG. 3, it should become apparent that for each curve, as the percent maximum air flow increases, the temperature rise provided by the energized stages of heating is reduced. Unit controller 30 does not directly effect the air flow through the temperature conditioning apparatus 10. Instead, air flow is determined by the demand for temperature conditioned air in the comfort zone 11, such that if the demand increases, the air flow increases. An increase in the air flow causes a decrease in the temperature rise and conversely a decrease in air flow causes an increase. The differential temperature, delta T, is therefore an indication of the temperature conditioning demand in the comfort zone 11.

In the specific example illustrated in FIG. 3, the expected range of differential temperatures for each of the stages of heating are shown in relation to the heating capacity curves. The differential temperature at which stages of heating are energized are represented by dots in circles, and the differential temperature at which the stages are de-energized are represented by x's in circles. The delta T at which stage 1 turns-on is shown by a dashed line. At 15° F. outdoor ambient temperature, stage 1 is energized when the delta T is less than about 6° F., and remains energized until the delta T increases to approximately 19° F. If the temperature conditioning demand exceeds the capacity of the first compressor stage 12a, unit controller 30 energizes compressor stage 2. This occurs when the delta T is equal to about $12\frac{1}{2}$° F. Unless the heating demand is satisfied by the percent maximum air flow and differential temperature describing points on one of the heating capacity curves which lie between the turn-off of a stage and the turn-on of a successive stage, unit controller 30 causes the successive stage to cycle on and off. The dashed arrows in FIG. 3 illustrate this action wherein the demand (which is indicated by a dot) would be satisfied by 60% maximum air flow and a delta T of 30° F. Since this demand does not lie on one of the heating capacity curves, it cannot be satisfied on a *continuous* basis by the available stages of heating. Compressor stages one and two (12a and 12b) are not adequate to meet the heating demand alone, therefore heating stage H1 (element 25a) is energized by unit controller 30, thereby causing the air flow to decrease and the differential temperature delta T, to increase. The differential temperature increases along the heating capacity curve H1, until it rises to the turn-off point for heating stage H1. At that time, unit controller 30 turns-off stage H1 (element 25a) causing the air flow to increase again and the differential temperature, delta T, to decrease along heating capacity curve C2. Heating stage H1 (element 25a) is again turned-on by unit controller 30, at a differential temperature of 20° F.

When operating in the cooling mode, unit controller 30 controls staging in response to the cooling demand; however, the differential temperature, delta T, is in terms of a temperature fall rather than a temperature rise, and in the preferred embodiment, only two stages of cooling are available to meet the cooling demand. Unit controller 30 does not adjust the expected range of differential temperatures as a function of the outdoor ambient temperature, as was done in the heating mode.

Figure 4:
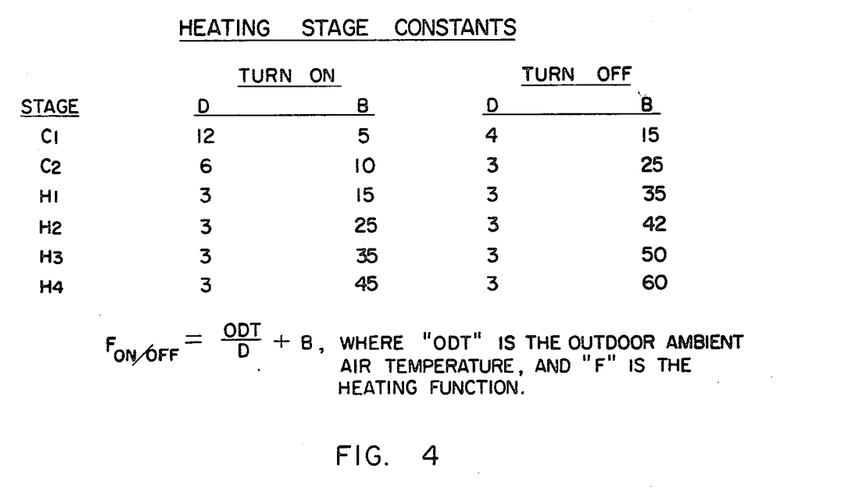
FIG. 4 is a table of the constants used to compute the expected range of differential temperatures for each stage of heating, as a function of the outdoor ambient temperature.

In the heating mode, microcomputer 44 calculates the expected range of differential temperature delta T for each stage of heating as a function of the outdoor ambient temperature, according to the equation $F_{On/Off} = ODT/D + B$ wherein ODT is the outdoor ambient temperature and the constants D and B, which are listed in the Table, FIG. 4, are contained in the read-only memory (ROM) of microcomputer 44. In illustration, at 15° F. outdoor ambient air temperature, the electric heating stage H1 (element 25a) would be energized at a differential temperature of 20° F. = 15°/3 + 15°. Heating stage H1 (element 25a) would be de-energized at 40° F. = 15°/3 + 35°. Thus, at 15° F. outdoor ambient air temperature, the expected range of delta T for which heating stage H1 (element 25a) should be energized is 20° to 40° F.

Figure 5:
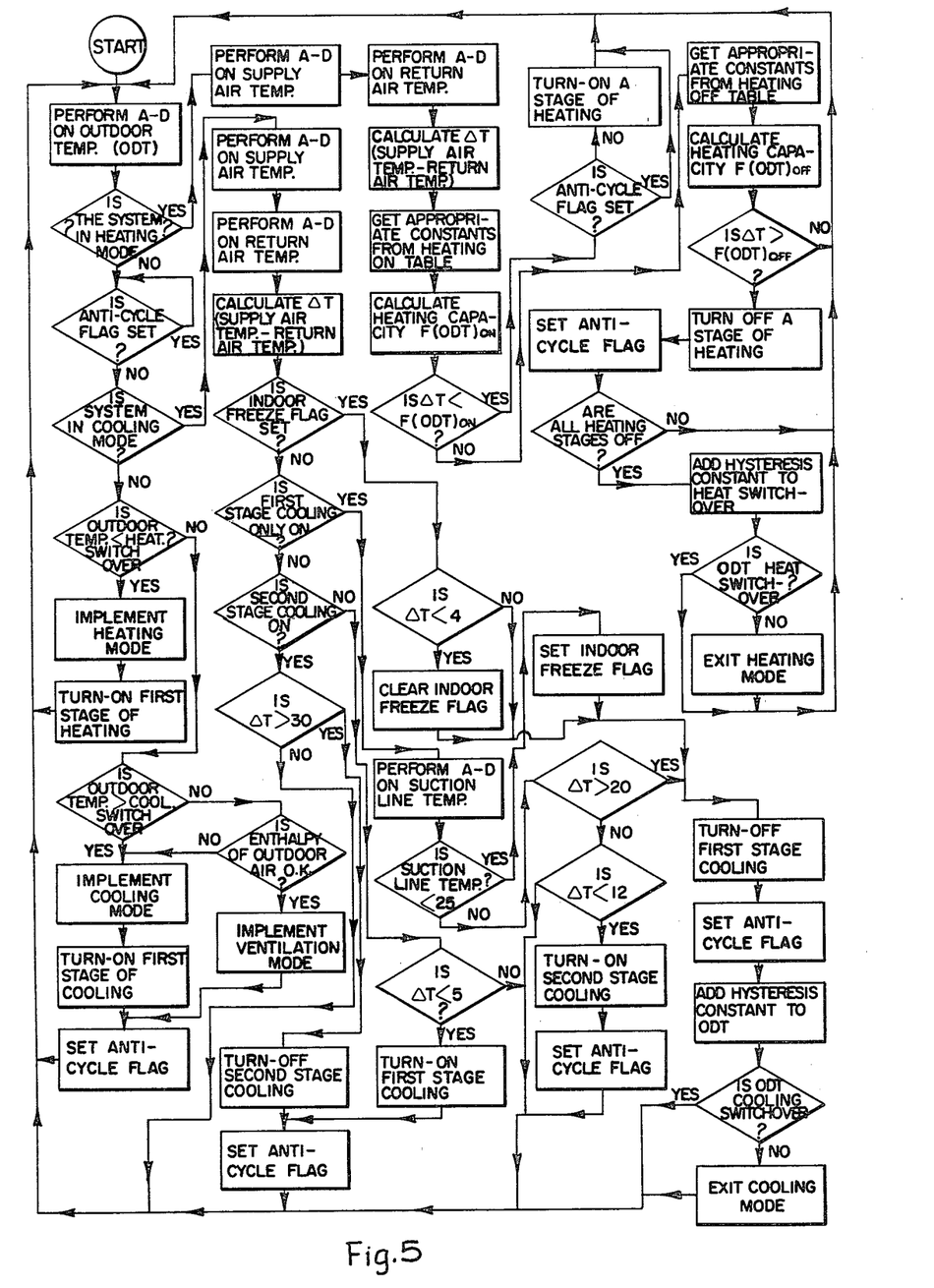
FIG. 5 is a flow chart illustrating the control logic for implementing the subject invention.

The flow chart illustrating the control logic for implementing the functions of the subject invention is shown in FIG. 5. Microcomputer 44 contains the machine language instructions in ROM for carrying out each step shown in the flow chart. Upon being energized, microcomputer 44 selects the outdoor ambient air temperature for analog-to-digital (A-D) conversion, via control signals sent over multiplex lines MUX1 through MUX3, thereby causing the multiplex chip 47 to transfer an analog signal indicative of the outdoor ambient air temperature into the input to the A-D converter of microcomputer 44. If the temperature conditioning apparatus 10 is not operating in the heating mode, the microcomputer 44 determines if the anti-cycle flag is set, and if so, awaits the expiration of the time delay period before proceeding. Further, if the temperature conditioning apparatus is operating in the ventilation mode, microcomputer 44 determines if the outdoor temperature is less than the heating switch-over temperature, a value stored in ROM. For purposes of the preferred embodiment, this value is 50° F. If this condition is met, microcomputer 44 implements the heating mode and turns on a first stage of heating. Otherwise, it checks to determine if the outdoor temperature is greater than the cooling switch-over temperature value, also stored in ROM (60° F. in the preferred embodiment), and if so, implements the cooling mode and turns on the first stage of cooling. However, if the outdoor temperature does not exceed the cooling switch-over temperature, microcomputer 44, via multiplexor 47 selects the analog signal input from the outdoor enthalpy sensor 35. If the outdoor ambient air enthalpy is less than a predetermined maximum, ambient air may be used for purposes of ventilation or cooling, and microcomputer 44 implements the ventilation mode wherein it causes damper assembly 24 to open fully, thereby admitting maximum outdoor ambient fresh air for circulation throughout the comfort zone 11. If the outdoor ambient air enthalpy exceeds the maximum acceptable value, then microcomputer 44 implements the cooling mode and turns on the first stage of cooling. As soon as the first stage of cooling is turned-on, the anti-cycle flag is set, thereby initiating a 256 second anti-cycle time period, during which stages of cooling may not be energized or de-energized. After setting the anti-cycle flag, program logic returns to the starting point.

If the temperature conditioning system 10 is operating in the heating mode, microcomputer 44 selects the supply air temperature for A-D conversion, followed by the return air temperature. From the resulting two digital values, microcomputer 44 calculates the differential temperature between the supply air and the return air temperatures. Depending on the heating stages which are energized, if any, the appropriate constants are obtained from a look-up table in ROM, to compute the heating function indicative of the heating capacity of the presently energized stages of heating for turning on an additional stage of heating. The values which are stored in the look-up table are shown in FIG. 4 as previously mentioned. If the calculated differential temperature is less than the calculated heating function value, indicating that the next stage of heating should be energized, and if the anti-cycle flag is not set, the next stage of heating is energized; otherwise, the program logic merely cycles back to the start of the program. If the differential temperature is not less than the heating function value for turning-on the next stage, the appropriate constants for calculating the heating function value with which the decision may be made to turn-off the stage of heating which was last energized, if any, is obtained from a look-up table in ROM. If the differential temperature is greater than the value of heating function for turning-off the last energized stage, that stage would be providing excessive heating capacity and would be turned-off. Otherwise, the program logic again cycles back to the start. A stage of heating may be turned off without concern for the condition of the anti-cycle flag, however an additional stage of heating may only be energized if the anti-cycle flag is not set. Once a stage of heating has been de-energized, the anti-cycle flag is set to prevent that stage from being re-energized for at least 256 seconds.

After all stages of heating are de-energized in the heating mode, the microcomputer 44 temporarily adds 2° F. hysteresis to the heating switch-over value. Thereafter, it determines if the outdoor ambient air temperature is less than the sum of the heating switch-over value plus the hysteresis constant. If this condition is not met, it exits the heating mode and returns to the start of the program. Otherwise, it remains in the heating mode, thereby avoiding unnecessary cycling between the heating mode and the ventilation mode.

Assuming that the temperature conditioning apparatus 10 is operating in the cooling mode, microcomputer 44 performs an A-D conversion of the supply air temperature and the return air temperature, and calculates their differential temperature. It next determines if the indoor freeze flag has been set, which is set, would indicate that the indoor heat exchange coil were partially blocked by frost. If the freeze flag is not set and if the first stage of cooling-only is energized, microcomputer 44 performs and A-D conversion of the suction line temperature. The indoor heat exchanger coil 21 is likely to be blocked by frost only at relatively low air flow rates with the first stage of cooling 12a energized. If the suction line temperature is less than 25° F., the indoor freeze flag is set and the first stage of cooling 12a is de-energized. The anti-cycle flag is also set, to prevent the first stage of cooling 12a from being re-energized for at least 256 seconds. Microcomputer 44 again temporarily adds 2° F. as hysteresis to the outdoor temperature, and thereafter determines if the outdoor ambient temperature, with hysteresis, is greater than the cooling switch-over value. If not, it exits the cooling mode and returns to the start of the program. Otherwise, it remains in the cooling mode when it returns to the start of the program. On successive cycles through the program logic, the indoor freeze flag will be cleared if the differential temperature is less than 4° F., indicating that substantially all the frost on the indoor heat exchanger coil 21 is melted. The temperature conditioning system 10 remains in the cooling mode with all stages of cooling 12 de-energized so long as the outdoor ambient air temperature, with hysteresis added is greater than the cooling switch-over value.

If the suction line temperature is not less than 25° with the first stage of cooling 12a energized, and if the differential temperature is greater than 20°, the first stage of cooling 12a is de-energized and the anti-cycle flag is set prior to determining if the outdoor ambient air temperature, with a constant added, is greater than the cooling switch-over value. However, if the differential temperature is not greater than 20° and is not less than 12°, the control logic returns to the start of the program. If the differential temperature is less than 12° with the first stage of cooling 12a energized, then microcomputer 44 energizes a second stage of cooling 12b and sets the anti-cycle flag prior to returning to the start of the program.

Assuming that the temperature conditioning apparatus 10 is operating in the cooling mode but that no stages of cooling 12 are energized, the first stage of cooling 12a will be energized and the anti-cycle flag set if the differential temperature is less than 5° F. If both stages of cooling 12 have been energized, the second stage of cooling 12b will be de-energized and the anti-cycle flag set if the differential temperature exceeds 30° F.

To summarize the operation in cooling mode, the first stage of cooling 12a is energized upon entry to the cooling mode, and will remain energized until either the suction line temperature is less than 25° F. indicating that the indoor coil 21 is at least partially blocked with frost, or until the differential temperature exceeds 20° F. The second stage of cooling 12b will be energized if the differential temperature is less than 12° F., and de-energized if it exceeds 30° F. Once the first stage of cooling 12a has been de-energized and assuming that, with the hysteresis constant added, the temperature conditioning apparatus 10 continues to operate in the cooling mode, the first stage of cooling 12a will only be energized if the differential temperature is less than 5°. In all cases, at least 256 seconds must elapse between changes of cooling staging. This is in contrast to the heating mode in which stages may be de-energized without waiting for 256 seconds after they are energized.

It may be desirable to operate in the cooling mode with the economizer damper assembly 24 open to a point in excess of its minimum required position, to take advantage of the free cooling available by the use of outdoor ambient air. Since microcomputer 44 is provided with inputs for both an outdoor enthalpy and outdoor ambient air temperature, it would be relatively easy to include provision for modulating the position of the economizer damper assembly 24 as a function of the outdoor ambient air temperature during operation in the cooling mode. The outdoor ambient enthalpy sensor would enable the microcomputer 44 to prevent the economizer damper assembly 24 from opening beyond the minimum position, if the enthalpy exceeded a maximum value.

The present invention is also applicable to temperature conditioning apparatus in which more than two stages of cooling are provided. In such a system, appropriate differential temperatures would be selected at which each of the available stages of cooling would be energized and de-energized in a manner analogous to that illustrated in FIG. 5, for a system encompassing only two cooling stages.

Although the present invention has been disclosed in a preferred embodiment utilizing a microcomputer, it is also possible that the invention could be carried out using hardware logic and discrete components, or by using a more sophisicated digital computer. In FIG. 2, two terminals labeled "External Control", are provided to enable an external controller to be connected to microcomputer 44. These two terminals can conduct bi-directional (half-duplex) serial digital communication between microcomputer 44 and an external control, such as a computer in an energy management system. Means are thereby provided for the external control to select alternative values for heating and/or cooling switch-over, and for communicating to the external control the digital values of the various temperatures measured in implementing the above-described control functions of unit controller 30.

While the present invention has been described with respect to a preferred embodiment, it is to be understood that modifications thereto will become apparent to those skilld in the art, which modifications lie within the scope of the present invention, as defined in the claims which follow.

We claim:
1. A method for controlling a temperature conditioning system having a plurality of stages which may be selectively energized to meet a temperature conditioning demand in a comfort zone, comprising the steps of
    controlling the temperature in the comfort zone approximately at a setpoint by adjusting the flow of temperature conditioned air supplied to the comfort zone;
    sensing the temperature of return air;

sensing the temperature of temperature conditioned supply air;

controlling selected apparatus of the temperature conditioning system in response to the differential temperature of the return air and the temperature conditioned supply air, to meet the temperature conditioning demand in the comfort zone.

2. A method for controlling the operation of components of a cooling system in which a plurality of cooling stages may be selectively energized to meet a cooling demand in a comfort zone into which the flow of cooled air is varied in response to temperature therein, said method comprising the steps of sensing the temperature of cooled supply air;
sensing the temperature of return air;
controlling the operation of the cooling system components in response to the differential temperature of the return air and the cooled supply air, whereby successive stages of cooling are energized as a function of the differential temperature of the return air and the cooled supply air.

3. The method of claim 2 further comprising the step of de-energizing the stages of cooling as a function of the differential temperature of the return air and the cooled supply air.

4. The method of claim 3 further comprising the steps of energizing a first stage of cooling if the differential temperature is less than a first minimum predetermined limit; and thereafter, following a time delay after each change of staging, successively energizing one or more additional stages of cooling if the differential temperature is less than other minimum predetermined limits for each said one or more additional stages of cooling, respectively; and de-energizing the stages of cooling if the differential temperature exceeds other maximum predetermined limits which are substantially different than the respective minimum predetermined limits for each stage of cooling, whereby the maximum and minimum predetermined limits for each stage provide hysteresis for the addition and the deletion of cooling stages.

5. A method for controlling the operation of components of a heating system in which a plurality of heating stages may be selectively energized to meet a heating demand in a comfort zone into which the flow of heated air is varied in response to temperature therein, said method comprising the steps of sensing the temperature of heated supply air;
sensing the temperature of return air;
controlling the operation of the heating system components in response to the differential temperature of the return air and the heated supply air, whereby successive stages of heating are energized as a function of the differential temperature of the return air and the heated supply air.

6. The method of claim 5 further comprising the step of de-energizing successive stages of heating as a function of the differential temperature of the return air and the supply air.

7. The method of claim 6 wherein the heating system includes an ambient air source heat pump having a plurality of heating stages and wherein the total heating capacity thereof varies with outdoor ambient temperature, said method further comprising repetitively performing the following steps:

(a) sensing the outdoor ambient temperature and determining therefrom the total heating capacity of the heating system with the stages of heating which are currently energized, if any;

(b) successively energizing an additional stage of heating if the differential temperature indicates that the heating capacity of any currently energized stages of heating is inadequate to meet the heating demand, said heating capacity being a function of the outdoor ambient temperature;

(c) successively de-energizing one or more stages of heating if the differential temperature indicates that the total heating capacity of the stages of heating which are energized, if any, is excessive; or else, (d) maintaining the currently energized stages of heating, if any, in operation, if neither condition (b) nor (c) is met.

8. The method of claim 6 wherein the heating system includes an ambient air source heat pump having a plurality of heating stages and wherein the heating capacity of one or more stages thereof varies with outdoor ambient temperature, and the magnitude of the differential temperature is indicative of the heating demand, said method further comprising repetitively performing the following steps:

(a) sensing the outdoor ambient temperature and determining therefrom an expected range of differential temperature for the currently energized one or more stages of heating, if any;

(b) successively energizing an additional stage of heating if the magnitude of the differential temperature is less than the expected range, whereby the heating capacity of the currently energized one or more stages is determined to be insufficient to meet the heating demand;

(c) successively de-energizing one or more stages of heating if the magnitude of the differential temperature is greater than the expected range, whereby the heating capacity of any energized stages of heating is determined to be excessive for the current heating demand; or else, (d) maintaining the currently energized stages of heating, if any, in operation, if the magnitude of the differential temperature lies within the expected range.

9. A method for controlling the operation of components of a temperature conditioning system in which a plurality of stages of temperature conditioning apparatus may be selectively energized to meet a temperature conditioning demand in a comfort zone into which the flow of temperature conditioned air is varied in response to temperature therein, said method comprising the steps of sensing the temperature of the temperature conditioned supply air;
sensing the temperature of return air;
controlling the operation of the temperature conditioning system components in response to the differential temperature of the return air and the supply air, whereby successive stages of temperature conditioning apparatus are energized as a function of the magnitude of the differential temperature of the return air and supply air.

10. The method of claim 9, further comprising the step of de-energizing successive stages of temperature conditioning apparatus as a function of the magnitude of the differential temperature of the return air and supply air.

11. The method of claim 10 wherein said temperature conditioning system comprises a cooling system including a plurality of cooling stages, said method further comprising the steps of energizing a first stage of cooling if the differential temperature is less than a first minimum predetermined limit; and thereafter, following a time delay after each change of staging, successively energizing one or more additional stages of cooling if the differential temperature is less than other minimum predetermined limits for each said one or more additional stages of cooling, respectively, and de-energizing the stages of cooling if the differential temperature exceeds other maximum predetermined limits for each stage of cooling, whereby the maximum and minimum predetermined limits for each stage provide hysteresis for the addition and the deletion of cooling stages.

12. The method of claims 4 or 11, wherein said cooling system further includes compressor means for compressing a vaporized refrigerant received via a suction line, and an indoor heat exchanger for providing heat transfer between the refrigerant and air circulated into the comfort zone, said method further comprising the steps of sensing the suction line temperature to determine the need for defrosting the indoor heat exchanger, to melt ice which has formed thereon; and if the suction line temperature is less than a predetermined limit, de-energizing the stages of cooling that are then operating, and thereafter continuing to circulate air through the cooling system; whereby the return air is cooled by the melting ice on the indoor heat exchanger.

13. The method of claim 12, further comprising the step of terminating the defrosting of the indoor heat exchanger, if the differential temperature indicates that substantially all the ice formed thereon is melted, at which time the cooling system may resume operation as before.

14. The method of claim 9 wherein the temperature conditioning system includes an ambient air source heat pump having a plurality of heating stages and wherein the total heating capacity thereof varies with outdoor ambient temperature, said method further comprising repetitively performing the following steps:
(a) sensing the outdoor ambient temperature and determining therefrom the total heating capacity of the temperature conditioning system with the stages of heating which are currently energized, if any;
(b) successively energizing an additional stage of heating if the differential temperature indicates that the heating capacity of any currently energized stages of heating is inadequate to meet the temperature conditioning demand, said heating capacity being a function of the outdoor ambient temperature;
(c) successively de-energizing one or more stages of heating if the differential temperature indicates that the total heating capacity of the stages of heating which are energized, if any, is excessive; or else
(d) maintaining the currently energized stages of heating, if any, in operation, if neither condition (b) nor (c) is met.

15. The method of claim 9 wherein the temperature conditoning system includes an ambient air source heat pump having a plurality of temperature conditioning stages and wherein the heating capacity of one or more stages thereof varies with outdoor ambient temperature, and the magnitude of the differential temperature is indicative of the temperature conditioning demand, said method further comprising repetitively performing the following steps:
(a) sensing the outdoor ambient temperature and determining therefrom an expected range of differential temperature for the currently energized one or more stages of heating, if any;
(b) successively energizing an additional stage of heating if the magnitude of the differential temperature is less than the expected range, whereby the heating capacity of the currently energized one or more stages is determined to be insufficient to meet the temperature conditioning demand;
(c) successively de-energizing one or more stages of heating if the magnitude of the differential temperature is greater than the expected range, whereby the heating capacity of any energized stages of heating is determined to be excessive for the current temperature conditioning demand; or else,
(d) maintaining the currently energized stages of heating, if any, in operation, if the magnitude of the differential temperature lies within the expected range.

16. The method of claims 7, 8, 14, or 15, wherein the step of energizing stages of heating includes the step of delaying for a period of time prior to energizing each successive stage of heating, and wherein the step of de-energizing stages of heating is executed without substantial time delay.

17. The method of claims 9, 11, 14, or 15, wherein the temperature conditioning system is selectively operable in either a heating mode, a cooling mode, or a ventilation mode, said method further comprising the steps of
sensing outdoor ambient temperature and enthalpy to determine the mode in which the temperature conditioning system should operate; and
i. selectively operating in the heating mode if the outdoor ambient temperature is less than a predetermined lower limit;
ii. selectively operating in the cooling mode if the outdoor ambient temperature exceeds a predetermined upper limit or if the outdoor ambient temperature is between the predetermined upper and lower limits and the outdoor ambient enthalpy exceeds an upper limit; or
iii. selectively operating in the ventilation mode if neither condition (i) nor (ii) is met.

18. The method of claim 17 further comprising the step of providing hysteresis in the response of the temperature conditioning system to the outdoor ambient temperature such that in the cooling mode, immediately after all stages of cooling are de-energized, the temperature conditioning system remains in the cooling mode only if the predetermined upper limit exceeds the sum of the outdoor ambient temperature and a first constant; and such that in the heating mode, immediately after all stages of heating are de-energized, the temperature conditioning system remains in the heating mode only if the outdoor ambient temperature is less than the sum of the predetermined lower limit and a second constant.

19. Apparatus for controlling a temperature conditioning system having a plurality of stages which may be selectively energized to meet a temperature conditioning demand in a comfort zone, comprising
means for sensing the temperature of return air;
means for sensing the temperature of temperature conditioned supply air;
means for regulating the flow of the supply air into the comfort zone so that the temperature in the comfort zone is maintained approximately at a setpoint;

means for controlling selected apparatus of the temperature conditioning system in response to the differential temperature of the return air and the temperature conditioned supply air, to meet the temperature conditioning demand in the comfort zone.

20. Apparatus for controlling the operation of components of a cooling system in which a plurality of cooling stages may be selectively energized to meet a cooling demand in a comfort zone into which the flow of cooled air is varied in response to temperature therein, said apparatus comprising means for sensing the temperature of cooled supply air;

means for sensing the temperature of return air;

control means responsive to the return air and supply air temperature sensing means, and operative to determine the differential temperature of the return air and the cooled supply air, and thereby operative to energize successive stages of cooling in response to the differential temperature.

21. The apparatus of claim 20 wherein the control means are operative to de-energize successive stages of cooling in response to the magnitude of the differential temperature.

22. The apparatus of claim 21, wherein the control means are further operative to energize a first stage of cooling if the differential temperature is less than a first minimum predetermined limit; and thereafter, effecting a time delay after each change of staging, to successively energize one or more additional stages of cooling if the differential temperature is less than other minimum predetermined limits for each one or more additional stages of cooling, respectively; and to successively deenergize the stages of cooling if the differential temperature exceeds other maximum predetermined limits which are substantially different than the respective minimum predetermined limits for each stage of cooling, whereby the maximum and minimum predetermined limits for each stage provide hysteresis for the addition and the deletion of cooling stages.

23. Apparatus for controlling the operation of components of a heating system in which a plurality of heating stages may be selectively energized to meet a heating demand in a comfort zone into which the flow of heated air is varied in response to temperature therein, said method comprising means for sensing the temperature of heated supply air;

means for sensing the temperature of return air;

control means responsive to the return air and supply air temperature sensing means and operative to determine the differential temperature of the return air and the heated supply air, said control means being operative to energize successive stages of heating in response to the magnitude of the differential temperature.

24. The apparatus of claim 23, wherein the control means are further operative to de-energize successive stages of heating in response to the magnitude of the differential temperature.

25. The apparatus of claim 24, further comprising an ambient air source heat pump having a plurality of heating stages, the total heating capacity of which varies with outdoor ambient temperature; and means for sensing the outdoor ambient temperature whereby said control means, being responsive thereto, are operative to:
(a) determine therefrom the total heating capacity of the heating system with the stages of heating which are currently energized; if any;
(b) successively energize an additional one or more stages of heating if the differential temperature indicates that the heating capacity of any currently energized stages of heating is inadequate to meet the heating demand, said heating capacity being a function of the outdoor ambient temperature;
(c) successively de-energize one or more stages of heating if the differential temperature indicates that the total heating capacity of the stages of heating which are energized, if any, is excessive; or else,
(d) maintain the currently energized stages of heating, if any, in operation, if neither condition (b) nor (c) is met.

26. The apparatus of claim 24, further comprising an ambient air source heat pump having a plurality of heating stages, the heating capacity of one or more stages thereof varying with outdoor ambient temperature; and means for sensing the outdoor ambient temperature; whereby said control means, being responsive thereto, are further operative to:
(a) determine therefrom an expected range of differential temperature for the currently energized one or more stages of heating, if any, said differential temperature being indicative of heating demand;
(b) successively energize an additional one or more stages of heating if the magnitude of the differential temperature is less than the expected range, whereby the heating capacity of any currently energized one or more stages is determined to be insufficient to meet the heating demand;
(c) successively de-energize one or more stages of heating if the magnitude of the differential temperature is greater than the expected range, whereby the heating capacity of any energized stages of heating is determined to be excessive for the current heating demand; or else,
(d) maintain the currently energized stages of heating, if any, in operation, if the magnitude of the differential temperature lies within the expected range.

27. Apparatus for controlling the operation of components of a temperature conditioning system in which a plurality of stages of temperature conditioning apparatus may be selectively energized to meet a temperature conditioning demand in a comfort zone into which the flow of temperature conditioned air is varied in response to temperature therein, said apparatus comprising means for sensing the temperature of the temperature conditioned supply air;

means for sensing the temperature of return air;

control means responsive to the return air and supply air temperature sensing means and operative to determine the differential temperature of the return air and the supply air, said control means being operative to energize successive stages of temperature conditioning apparatus in response to the magnitude of the differential temperature.

28. The apparatus of claim 27, wherein the control means are further operative to de-energize successive stages of temperature conditioning apparatus in response to the magnitude of the differential temperature.

29. The apparatus of claim 28 wherein said temperature conditioning system comprises a cooling system including a plurality of cooling stages, said control means being further operative to energize a first stage of cooling if:

the differential temperature is less than a first minimum predetermined limit; and thereafter, effecting a time delay after each change of staging, to successively energize one or more additional stages of cooling if the differential temperature is less than other minimum predetermined limits for each said one or more additional stages of cooling, respectively, and to successively deenergize the stages of cooling if the differential temperature exceeds over maximum predetermined limits for each stage of cooling, whereby the maximum and minimum predetermined limits for each stage provide hysteresis for the addition and the deletion of cooling stages.

30. The apparatus of claims 22 or 29, wherein said cooling system further includes compressor means for compressing a vaporized refrigerant received via a suction line; means for sensing the temperature of the suction line; and an indoor heat exchanger for providing heat transfer between the refrigerant and air circulated into the comfort zone; whereby said control means are responsive to the suction line temperature sensing means and are operative to determine the need for defrosting the indoor heat exchanger to melt ice which has formed thereon, by the magnitude of the suction line temperature; and if the suction line temperature is less than a predetermined limit, to de-energize the stages of cooling that are then operating, thereafter to continue to circulate air through the cooling system; whereby the return air is cooled by the melting ice on the indoor heat exchanger.

31. The apparatus of claim 30, wherein the control means are further operative to terminate the defrosting of the indoor heat exchanger, if the magnitude of the differential temperature indicates that substantially all the ice formed thereon is melted.

32. The apparatus of claim 27, further comprising an ambient air source heat pump having a plurality of heating stages, the total heating capacity of which varies with outdoor ambient temperature; and means for sensing the outdoor ambient temperature; whereby said control means being responsive thereto, are further operative to:
(a) determine therefrom the total heating capacity of the temperature conditioning system with the stages of heating which are currently energized, if any;
(b) successively energize an additional one or more stages of heating if the differential temperature indicates that the heating capacity of any currently energized stages of heating is inadequate to meet the temperature conditioning demand, said heating capacity being a function of the outdoor ambient temperature;
(c) successively de-energize one or more stages of heating if the differential temperature indicates that the total heating capacity of the stages of heating which are energized, if any, is excessive; or else
(d) maintain the currently energized stages of heating, if any, in operation, if neither condition (b) nor (c) is met.

33. The apparatus of claim 27, further comprising an ambient air source heat pump having a plurality of temperature conditioning stages, the heating capacity of one or more stages thereof varying with outdoor ambient temperature; and means for sensing the outdoor ambient temperature; whereby said control means being responsive thereto, are further operative to:
(a) determine therefrom an expected range of differential temperature for the currently energized one or more stages of heating, if any; said differential temperature being indicative of heating demand;
(b) successively energize an additional one or more stages of heating if the magnitude of the differential temperature is less than the expected range, whereby the heating capacity of any currently energized one or more stages is determined to be insufficient to meet the heating demand;
(c) successively de-energize one or more stages of heating if the magnitude of the differential temperature is greater than the expected range, whereby the heating capacity of any energized stages of heating is determined to be excessive for the current heating demand; or else,
(d) maintain the currently energized stages of heating, if any, in operation, if the magnitude of the differential temperature lies within the expected range.

34. The apparatus of claims 25, 26, 32, or 33 wherein the control means are operative to effect a delay for a period of time prior to energizing each successive stage of heating, but are operative to de-energize stages of heating without substantial time delay.

35. The apparatus of claims 27, 29, 32, or 33, wherein the temperature conditioning system is selectively operable in either a heating mode, a cooling mode or a ventilation mode, further comprising means for sensing outdoor ambient temperature and means for sensing the outdoor ambient enthalpy, to determine the mode in which the temperature conditioning system should operate; whereby said control means are responsive to the outdoor ambient temperature and enthalpy sensing means to:
i. selectively operate it in the heating mode if the outdoor ambient temperature is less than a predetermined lower limit;
ii. selectively operate the temperature conditioning system in the cooling mode if the outdoor ambient temperature exceeds a predetermined upper limit or if the outdoor ambient temperature is between the predetermined upper and lower limits and the outdoor ambient enthalpy exceeds an upper limit; or
iii. selectively operate it in the ventilation mode, wherein outdoor air which is not temperature conditioned is supplied to the comfort zone to meet a cooling demand, if neither condition (i) nor (ii) is met.

36. The apparatus of claim 35, wherein the control means are further operative to provide hysteresis in response of the temperature conditioning system to the outdoor ambient temperature such that in the cooling mode, immediately after all stages of cooling are de-energized, the temperature conditioning system remains in the cooling mode only if the predetermined upper limit exceeds the sum of the outdoor ambient temperature and a first constant; and such that in the heating mode, immediately after all stages of heating are de-energized, the temperature conditioning system remains in the heating mode only if the outdoor ambient temperature is less than the sum of the predetermined lower limit and a second constant.

* * * * *

UNITED STATES PATENT AND TRADEMARK OFFICE
CERTIFICATE OF CORRECTION

PATENT NO. : 4,353,409

DATED : October 12, 1982

INVENTOR(S) : James F. Saunders and Robert E. Krocker

It is certified that error appears in the above-identified patent and that said Letters Patent are hereby corrected as shown below:

Column 17, claim 29, line 14, delete "over" and insert --other--.

Signed and Sealed this

Seventh Day of December 1982

[SEAL]

Attest:

GERALD J. MOSSINGHOFF

Attesting Officer    Commissioner of Patents and Trademarks